Figure 3:
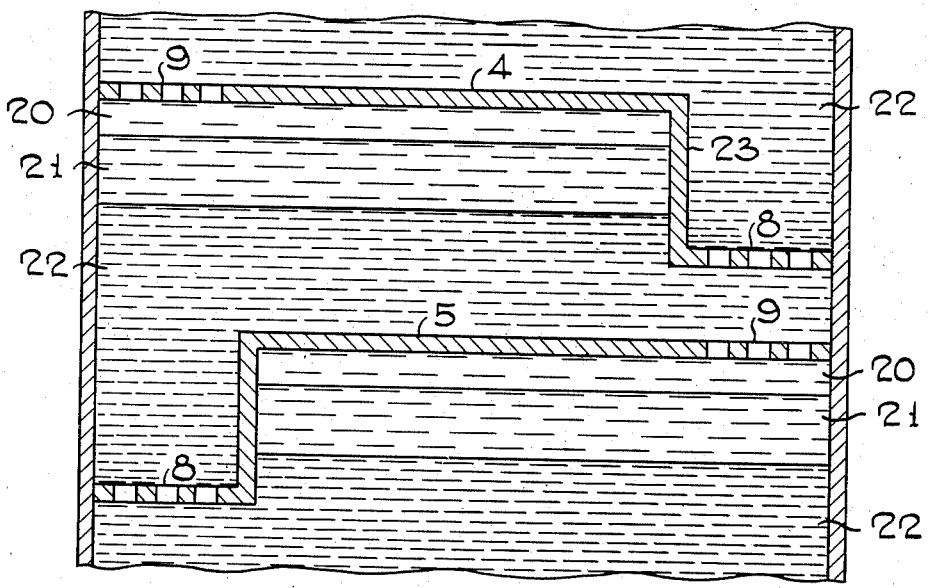

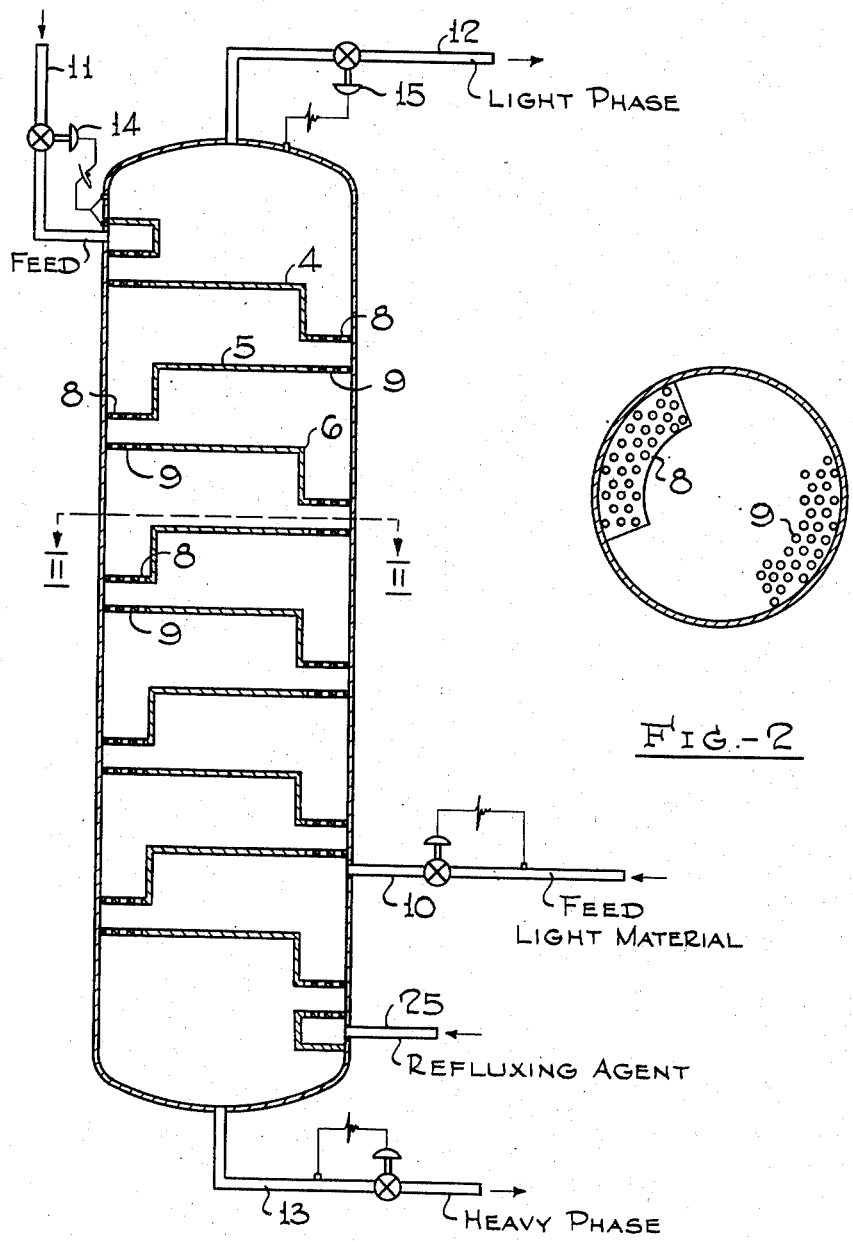

Sept. 9, 1952          J. W. PACKIE                2,610,108
                LIQUID-LIQUID EXTRACTION TOWER
Filed Jan. 26, 1949                        2 SHEETS—SHEET 2

John W. Packie  Inventor
By W. O. J Heilman  Attorney

Patented Sept. 9, 1952

2,610,108

UNITED STATES PATENT OFFICE 2,610,108

LIQUID-LIQUID EXTRACTION TOWER

John W. Packie, Maplewood, N. J., assignor to Standard Oil Development Company, a corporation of Delaware Application January 26, 1949, Serial No. 72,841

3 Claims. (Cl. 23—270.5)

The present invention relates to an improved process and apparatus for the contacting of two partly miscible liquids or of two substantially immiscible liquids. The invention is adaptable for the contacting of liquids in any liquid-liquid system. In accordance with the present invention perforated plates are provided in a vertical contacting tower, adapted to permit the maintenance of the level of the heavy liquid phase present above the top plate of the tower, and adapted to permit the mixing of the liquids on each plate below the interface between the light and heavy liquid phases present.

The invention is directed broadly to processes in which liquids are segregated by selective solvent action. At the present time there are a great many chemical processes in which a selective solvent is used to treat a particular liquid in order to secure a partial segregation of chemical constituents of the liquid. For example, petroleum oils are conventionally treated with solvents such as liquid sulfur dioxide, phenol, creosole, nitrobenzene, furfural, aniline, ether and other solvents or mixture of such solvents. Use of these solvents with petroleum oils is particularly employed to remove low viscosity index constituents of the oil to obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications are used to control the solvent extraction process as desired. For example, auxiliary solvents, or modifying agents may be injected into the treating system. Again a wide range of temperature and pressure conditions may be employed in particular types of solvent extractions. The present invention is not concerned with the modifications or refinements of solvent treating processes. Rather, the invention is concerned with the basic method and apparatus used for contacting liquids whatever the particular system may be. It is, therefore, to be understood that this invention is of application to any liquid-liquid contacting system with any of the modifications, which may be employed in such processes.

Of the many methods which have been devised for the contacting of liquids, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of a wide variety of types; some employing various types of packing materials, others employing bubble cap plates, and other employing a variety of internal baffles. However, of the various types of fluid contacting towers developed, those involving the use of pierced plates have proven to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50% and in some liquid-liquid systems, as low as about 10%. The term plate efficiency may be defined as the inverse ratio of the number of plates required to equal the effect obtainable in a perfect mixing and settling stage expressed in percent. Thus one theoretical stage is established by contacting two liquids intimately in a batch mixer followed by a thorough settling in a batch settler. As stated, therefore, conventional pierced plate liquid contacting towers, due to their plate efficiency of less than 50% require a number of plates greater than twice the number of theoretical stages of contacting required. It is clearly of the greatest importance to improve the plate efficiency of the types of pierced plates used in such towers in order to decrease the expense of the contacting and to decrease the size of the towers necessary. In this connection it is also highly advantageous to reduce the size of the tower since the smaller the tower the more responsive the tower is to changes in operating conditions. It is, therefore, the principal object of this invention to provide an improved type of pierced plate extraction tower in which the plate efficiencies are substantially greater than those presently obtainable.

In analyzing the necessary mechanism required in liquid-liquid contacting it is apparent that two basic effects are required. These are efficient mixing of the liquids followed by efficient separation of the mixed liquids. Thus in extraction towers having a given number of plates, for best overall results it is necessary that each set of plates provide good mixing and provide good settling. Only by achieving both of these desiderata in such a tower is it possible to secure treating effects equivalent to a large number of theoretical stages. Thus in considering any one pair of extraction plates, high plate efficiencies can only be obtained if the plates are capable of both adequately mixing and thoroughly separating the mixed liquids. It is, therefore, a further and more particular object of this invention to provide a type of pierced plate which will most effectively be capable of adequately mixing and thoroughly settling liquid phases passing through each pair of plates.

In order to secure efficient mixing and settling of the liquids it is necessary to consider the basic characteristics of the liquids insofar as their mixing and settling properties are concerned. Thus particular liquids such as phenol and oil may be very readily mixed and when mixed may be difficult to separate. Alternatively, other types of liquids such as aqueous caustic and oil for example may be difficult to mix but may be readily separated. As a result of this factor it is generally necessary to critically adjust a particular extraction tower to secure the optimum treatment of liquids having particular mixing and settling characteristics. It is, therefore, a further object of this invention to provide means for adapting a particular contacting tower employing pierced plates to the optimum contacting conditions for liquids of particular mixing and settling characteristics.

Perforated plate towers, may be operated to maintain the interface level of the heavy phase near the bottom of the tower. As a result of this operating method the light liquid phase may be considered to be the continuous phase extending substantially throughout the tower. In certain liquid-liquid contacting systems, utilizing step type plates provided with light and heavy phase perforations, the fact that the light phase is continuous brings about undesired effects. For example, if the liquid-liquid system is such that the heavy phase liquid tends to entrain in the light phase liquid, once entrainment is initiated there is a tendency for the entrainment to become progressively worse. Thus let it be assumed that a tower is operated with the interface level of the heavy phase near the bottom of the tower. In such a tower the head of the heavy phase liquid built up on the plate depends upon the sum of the pressure drops incurred by the light and heavy phase perforations of each plate as set by the rate of flow of the two liquids. Consequently if the rate of through-put of light phase liquid, heavy phase liquid, or both is increased, the head of heavy phase liquid is increased, thus reducing the layer of light phase liquid. This results in decreasing the settling volume available for the separation of heavy phase liquid from light phase liquid in a manner causing a progressive increase in entrainment from plate to plate. In accordance with this invention, however, the interface level of the heavy phase is maintained near the top of the tower rather than at the bottom of the tower. In this case, an increase in tower through-put will increase the thickness of the layer of light phase liquid on each plate providing greater capacity for the settling of heavy phase liquid from the light phase liquid. In other words the liquid-liquid contacting tower of this invention provides self-rectifying means for overcoming the entrainment of heavy phase liquid in the light phase liquid. By this means tower capacities may be safely increased beyond those otherwise obtainable.

Another characteristic of the process of this invention is carrying out the mixing of the two liquid phases below the interface between the light and heavy phases. By conducting the mixing operation in this fashion it is possible to secure a more intimate mixing in liquid-liquid systems wherein the quantity of heavy phase is small as compared with the quantity of light phase. The present invention is of particular application in this connection to the contacting of hydrocarbon oils with water and caustic. Furthermore in systems such as phenol and oil wherein the light phase is hard to settle, the settling is improved if the mixing is carried out below the heavy phase interface.

The present invention also permits a wide variation in operating conditions without disrupting the normal operation of the tower by utilizing a level control for introduction of heavy phase, a pressure control for removal of the light phase, and flow controls for the other streams.

The manner in which the above indicated objectives of this invention may be obtained will be understood from a consideration of the following description drawn with reference to the accompanying drawings. In these drawings, Fig. 1 represents a somewhat diagrammatical elevational cross-section drawing of a liquid-liquid extraction tower embodying the principals of this invention, Figure 2 shows a cross-section of Fig. 1 through the line II—II of Fig. 1, and Figure 3 diagrammatically represents the manner in which layers of heavy phase liquid, light phase liquid and emulsion build up on the plates of the tower illustrated in Figure 1.

Referring now to the drawings, it will be noted that the extraction tower illustrated comprises a vertically elongated cylinder, being provided with a plurality of horizontally disposed perforated plates. The plates are identified by the numerals 4, 5, 6, etc. Each plate consists of two step-wise sections. The upper step of each plate extends approximately .8 to .9 of the way across the tower while the lower step of each plate extends the remaining distance. The horizontal portion of each of the lower steps is perforated by the perforations indicated by the numeral 8. Each successive plate in the tower is placed in reverse relationship with the plate immediately above or below so that the lowermost step of one plate, such as plate 4, is above the uppermost step of the next lower plate, such as plate 5, and is separated therefrom by about 2 to 8 inches. The portion of the upper step of each plate lying directly below the perforated lower step of the plate above is perforated by the perforations indicated by the numeral 9. Consequently a relatively small confined zone is provided between perforations 8 and 9 of adjacent plates. It will be noted that a relatively enlarged zone is provided by the remaining unperforated portions of adjacent plates, such as the zone between the upper step of plate 5 and the upper step of plate 6. This zone may extend vertically from about 18 inches to 3 feet.

It is preferred that the perforations and the steps of each plate be provided on a circumferential portion of the plate covering an arc of about 90° as illustrated by Figure 2. If desired, however, the perforations and steps may be arranged on segments of the plate. Suitable perforations may be provided by drilling a large number of ¼ inch to ½ inch holes. As will be developed, the number and size of the perforations indicated by the numerals 9 are selected to provide high pressure drop relative to the pressure drop through perforations 8. By maintaining the pressure drop due to the perforations 9 several-fold greater than the pressure drop due to the perforations 8, it is possible to secure sufficient mixing action without providing too great a total pressure drop through both the perforations 8 and 9, while at the same time maintaining the pressure drop through the perforations 9 sufficiently high to minimize the possibility of heavy phase liquid passing downwardly through these perforations. It is not necessary that the tower have the elongated cylindrical shape indicated, nor that the relationship of the size of the lower or upper step of each plate be exactly that indicated. Each of the above indicated variables may best be adjusted within wide limitations dependent upon the particular liquid-liquid contacting system.

In operating the extraction tower illustrated in the drawing, a feed of light phase liquid material is introduced substantially at the bottom of the tower through line 10. The heavy phase liquid material is introduced substantially at the top of the tower through line 11. Light phase liquid is withdrawn from the top of the tower through line 12, while heavy phase liquid is withdrawn from the bottom of the tower through line 13. If a refluxing action is desired, a refluxing agent may be introduced below the point of light phase feed introduction through line 25. In the case of phenol treating of oil for example, a suitable refluxing agent is water. In accordance with this invention the interface level between the light and heavy liquid phases is maintained substantially at the top of the tower, at a point for example somewhat above that at which the heavy feed material is introduced through line 11. Positioned within the tower at the desired level for the light and heavy phase interface is a level controller 14 of conventional type. This level controller is operative to control the flow of the heavy phase liquid through line 11 so as to permit just enough liquid to flow into the tower to maintain the light and heavy phase interface at the top of the tower. The light phase withdrawn through line 12 is controlled by valve 15 operated by a pressure responsive element which may be positioned in the light phase withdrawal line or in the top of the extraction tower. By this means sufficient quantities of light phase liquid are released through line 12 to maintain the pressure within the tower at a desired amount. The heavy phase withdrawal through line 13 at the bottom of the tower, and the light phase feed through line 10 are both controlled by conventional flow controllers which may be set to maintain a desired flow in the two lines. It is apparent that in the system described the comparative flow of light and heavy phase liquid may be controlled by the flow controllers of lines 10 and 13 while the pressure existing in the tower may be controlled by the pressure controller in line 12. It will also be noted that due to the manner in which the level controller of line 11 is utilized, the interface level between the light and heavy liquid phases will be maintained at the top of the tower. Consequently the heavy phase may be considered to be the continuous phase extending throughout the tower.

In operating the tower which has heretofore been described, light phase liquid will pass upwardly through the tower while heavy phase liquid will pass downwardly through the tower. Layers of light phase liquid will extend beneath the lower side of each of the uppermost steps of the plates while upper layers of heavy phase liquid will lie on the upper side of the uppermost perforated step of each of the plates. An unstable emulsion of light and heavy phase liquids will also generally exist between the layers of light and heavy phase liquid. Sufficient layers of light and heavy phase will exist as indicated so as to provide the required pressure drops to drive the liquids through the perforations provided in the steps.

Due to the pressure differential developed by the layers of light and heavy phase liquids, heavy phase liquid will be jetted downwardly through the perforations 8, while light phase liquid will be jetted upwardly through the perforations 9. These jets of light and heavy phase liquid will meet in the relatively confined zone between the perforations 8 and 9 so as to provide intimate mixing of the two liquids. The two liquids will then flow inwardly towards the center of the tower into the enlarged zone provided between unperforated portions of adjacent plates. The liquids will flow from the mixing zone to the settling zone in the form of an unstable emulsion. Consequently, as the liquids move across the plate towards the side of the tower away from the mixing zone, separation of this emulsion will occur to provide the layers of light and heavy phase liquid formerly referred to.

Referring now to Figure 3 a clearer understanding of this invention may be obtained. Diagrammatically illustrated in this figure is the manner in which layers of light and heavy phase liquid build up on the plates of this invention to provide the necessary pressure differential to drive the liquids through the plates. An analysis of Figure 3 is also helpful in understanding the advantages of the contacting method of this invention, particularly with regard to the improved mixing obtainable below the heavy phase inter-face and with regard to the self-rectifying entrainment action of the tower of this invention.

As formerly described and as diagrammatically illustrated in Figure 3, a layer of light phase liquid 20 will exist below the uppermost step of a plate such as plate 4. A layer of heavy phase liquid 22 will lie above a plate such as 4 or 5, and a layer of unstable emulsion 21 will lie between the layers 20 and 22. It is apparent that the pressure differential available to drive heavy phase liquid through the perforations 8 will be equal to the pressure differential between the layers of heavy phase liquid vertically above the perforations 8, and the layers of light phase liquid and emulsion 20 and 21 on the opposite side of the vertical partition 23. Qualitatively, therefore, it may be observed that the driving force of liquids through the perforations is dependent upon the layers of light phase insofar as a greater pressure differential may only be achieved by building up the layers of light phase liquid. Thus, for example, considering Figure 3, if flow conditions exist to provide the layers of liquid indicated in this figure, and flow conditions are then increased, it is apparent that the layers of light phase liquid 20, and or 21 must be increased to provide the necessary pressure differential. Consequently, in liquid-liquid systems wherein it is difficult to settle heavy phase liquid from light phase liquid, the contacting plates of this invention are self-rectifying as regards entrainment; increase in liquid throughout rates necessarily operates to cause greater layers of light phase liquid to build up, providing greater settling capacity to permit the heavy phase liquid to separate from the light phase liquid.

Examining Figure 3, it is also possible to qualitatively appreciate the advantages of this invention for contacting operations where a large amount of light phase liquid is used, and where a small amount of heavy phase liquid is used. For example, in the treatment of oils with caustic solutions, small ratios of caustic to oil may be used, such as about 10% of caustic and 90% of oil. In the contacting of liquids in such a system, it is difficult to effectively mix the liquids so that the small amount of the one liquid used contacts all of the large amount of the other liquid used. This type of mixing is greatly aided by the process and apparatus of this invention. In considering the liquid-liquid contacting of caustic and oil, and referring to Figure 3, layers of caustic will correspond to layers 22 illustrated, while layers of oil will correspond to layers 20. Consequently, the mixing of the caustic and oil will occur between the perforations 8 and 9, as caustic is jetted downwardly through the perforations 8, and as oil is jetted upwardly through the perforations 9. It will be noted that this mixing is conducted below the inter-face between the heavy phase 22, and the light phase 21. Consequently the entire body of oil employed will have to flow through the perforations 9 through the layer of caustic, resulting in improved contacting efficiency over a system in which the caustic would be mixed in a layer of oil.

As an illustrative example of the practical application of this invention to a typical contacting problem, the pressure differentials and design considerations involved will be briefly considered. The contacting of phenol with oil will be taken as an example. The first step in designing a suitable tower according to this invention is to set the perforations 8 and 9 so as to provide suitable pressure drops through these perforations to obtain the desired amount of mixing of the two liquids. To accomplish this it is preferred that the pressure drop through the perforations 9 be made several-fold greater than the pressure drop through the perforations 8 so as to avoid the possibility of heavy phase liquid flowing downwardly through the perforations 9. If it be assumed that a given volume of oil and a given volume of phenol are to be contacted, it may be found that suitable perforations will be provided if the pressure drop through the perforations 9 is equal to 0.6" of oil and the pressure drop through the perforations 8 is equal to 0.3" of phenol. The total pressure drop through these perforations, therefore, is equal to 0.6" of oil times its density, 0.85, plus 0.3" phenol times its density 1, or the total pressure drop is equal to 0.81" of water. By experimental procedures it is then necessary to determine what emulsion thickness, or settling capacity is required to separate phenol and oil when mixed by the jetting of phenol and oil through the perforations 8 and 9 at the indicated flow rates and pressure drops. Let it be assumed that this establishes that this emulsion layer is 6" deep. With these assumptions it is then possible to compute the thickness of the oil layer 20 and to compute the necessary displacement of plates 4 and 5. In order to work this out it is necessary to consider the pressure differential existing across a typical plate such as plate 4 in Figure 3. The total pressure drop through the perforations 8 and 9 must equal the total pressure differential due to the thickness of light phase liquid 20 and emulsion 21 on one side of vertical partition 23 as opposed to heavy phase liquid on the opposite side of partition 23. Since it has been assumed that the emulsion layer is 6" deep, the pressure differential due to the emulsion layer is equal to 6" of phenol times its density, 1, minus 6" of emulsion times its density, which may be considered to be about 0.92, providing a total pressure differential due to the emulsion layer of 0.48" of water. Consequently, the layer of oil 20 must be such as to provide a pressure differential equal to the total pressure drop through the perforations 8 and 9 minus the pressure differential due to the thickness of the emulsion layer, or 0.81" of water minus 0.48" of water, or 0.33" of water. Insofar as the differential density of phenol and oil is 1 minus 0.85 or 0.15, therefore, the oil depth will be 0.33 divided by 0.15 or 2.2". Therefore, as worked out in the example given, layer 20 of Figure 3 will be 2.2" thick, while layer 21 of Figure 3 will be 6" thick A practical dimension to use for the separation of plates 4 and 5 would, therefore, be about 30" as measured from the uppermost step of plate 4 to the uppermost step of plate 5. A practical separation of perforations 8 and 9 would then be about 6" causing the vertical partition 23 to be 24" in height.

To understand the mechanism by which entrainment is made self-rectifying in accordance with this invention let it now be assumed that both the phenol and oil rates of the above example are increased by 50%. This increase will result in a 125% increase in the pressure drop of the phenol passing the perforations 8, and of the oil passing the perforations 9. Consequently the pressure drop through the perforations 9 would be equal to 1.35" of oil and the pressure drop of the phenol through the perforations 8 will be equal to 0.675" of phenol. The total pressure drop through the perforations 8 and 9 would, therefore, be 1.82" of water. Let it be assumed that under these conditions of flow, the mixing obtained is such as to require 22" of emulsion. It will be noted that this thickness of emulsion is almost 4 times the thickness established in the first example above. The extra thickness of emulsion would be required since the extent of mixing of phenol and oil would be increased by the 50% increase in flow rates of phenol and oil. The depth of the oil layer 20 may, therefore, be found by subtracting the pressure differential of 22" of emulsion as against 22" of phenol from the total pressure drop through the perforations 8 and 9, resulting in an oil depth of 0.4" It is, therefore, to be seen, as worked out, that increasing the flow rates of Example 2 over Example 1 by 50% with the consequent increase in pressure drop through the perforations 8 and 9, results in an increase of the oil settling capacity of the system of 2.2" to 22.4". Restating this as demonstrated, an increase in the flow rates of either or both of the liquids involved, will in the tower of this invention result in an increase of settling capacity compensating the increased mixing obtained as a result of the increased flow rates.

Analyzing the pressure differentials of Figure 3 in the manner indicated in the above examples, it is apparent that the maximum capacity of the tower will be achieved when the emulsion layer 21 and oil layer 20 are sufficiently thick to extend to the bottom of the vertical partition 23, or to the level of the perforations 8. In other words the maximum pressure differential which can be developed corresponding to the maximum capacity of the tower will exist when the layers of light phase liquid extend to the level of the perforations 8. A second limit on the operational capacity of the tower is achieved when the settling capacity required is so great as to fail to provide any oil layer 20 in the tower. In the practical design of the tower, according to this invention, therefore, the perforations 8 and 9 and the separation of plates 4 and 5 must be chosen so as to provide sufficient capacity for operation over the throughputs for which the tower is designed. Upon consideration it will be seen that the maximum flexibility in throughputs obtainable is achieved when the total pressure drop through the perforations 8 and 9 is as small as practical consistent with maintaining sufficiently high pressure drops to provide the desired amount of mixing.

By the nature of the apparatus described it has been found possible to markedly increase the efficiency of liquid-liquid contacting. This is attributed to increasing the intimacy of mixing in systems wherein the quantity of heavy phase is small as compared to the quantity of light phase. Thus effectively the mixing is conducted by dispersing the light phase liquid throughout the heavy phase liquid as mixing takes place below the level of the heavy phase. Again the efficiency of contacting is improved in systems tending towards entrainment of heavy phase liquid in light phase liquid since any entrainment causes a buildup in light phase layers to increase the settling capacity. In this respect any entrainment on one plate of the tower results in conditions on other plates rectifying the tendency toward entrainment. Additional improvements in operation are obtained by virtue of the level and flow controls utilized. The controls of lines 10 and 13 may be adjusted as desired to provide fixed operating controls. Variations in the flow of lines 11 and 12 may then be tolerated without affecting liquid throughputs or contacting conditions in the tower. The flexibility in operation thus possible, as aided by the self-rectifying characteristics of the tower, markedly contribute to the utility of the present invention.

What is claimed is:

1. An improved liquid-liquid extraction tower comprising a vertical treating tower having a plurality of horizontally disposed plates extending throughout the tower, each of said plates consisting of two steps extending completely across the tower and having at least a portion of each of the steps perforated and each of said plates being in reversed relationship with successive plates in the tower whereby the lower step of one plate is adjacent the upper step of a successive plate, said perforations of successive plates being positioned so as to be substantially in vertical alignment, a light phase liquid feed substantially at the bottom of the tower, a heavy phase withdrawal at the bottom of the tower and a light phase withdrawal at the top of the tower associated with a pressure responsive flow control means and a heavy phase feed substantially at the top of the tower associated with a level controlled flow control means positioned substantially at the top of the said tower.

2. A liquid-liquid contacting tower consisting of an elongated vertical treating tower, a plurality of vertically displaced horizontally disposed partially perforated plates fixed to and positioned in said tower, each of said plates consisting of two sections arranged in step-wise relationship having the horizontal portion of the upper section of the said plates four to nine times the length of the horizontal portion of the lower section of the said plates and having at least a part of both horizontal portions of the said plates perforated, adjacent plates of the said tower being in reversed relation with each other whereby the lowermost portion of one plate is vertically aligned with the uppermost portion of an adjacent plate and said perforations being so positioned as to be in substantially vertical alignment, liquid inlet means adjacent the top and bottom of said tower and liquid outlet means substantially at the top and bottom of the said tower.

3. In a liquid-liquid contacting tower containing a plurality of superimposed verticallly displaced perforated plates, the improvement which consists of individual perforated plates extending completely across the tower and consisting of two horizontal perforated plane elements joined in step-wise relation by an imperforated vertical plane element in which the upper of the said plane elements has a length across the tower four to nine times the length of the lower of the plane elements, each superimposed pair of said individual perforated plates being in reversed relation with each other whereby the lowermost portion of one plate is vertically aligned with the uppermost portion of an adjacent plate and said perforations are so positioned as to be in substantially vertical alignment.

JOHN W. PACKIE.

REFERENCES CITED

The following references are of record in the file of this patent:

UNITED STATES PATENTS

| Number | Name | Date |
| --- | --- | --- |
| 1,751,862 | Huff | Mar. 25, 1930 |
| 1,951,787 | Child et al. | Mar. 20, 1934 |
| 2,009,347 | Sheldon | July 23, 1935 |
| 2,076,126 | Guinot | Apr. 6, 1937 |
| 2,091,645 | McConnell | Aug. 31, 1937 |
| 2,192,094 | Moore | Feb. 24, 1940 |
| 2,271,462 | Pfenning | Jan. 27, 1942 |
| 2,299,426 | Rosebaugh | Oct. 20, 1942 |
| 2,361,780 | Lewis | Oct. 31, 1944 |
| 2,400,378 | Stines | May 14, 1946 |
| 2,460,019 | Long et al. | Jan. 25, 1949 |